June 21, 1960    W. S. KLECZEK    2,941,543
PRESSURE REGULATOR MODIFICATION
Filed Sept. 29, 1958

INVENTOR,
Walter S. Kleczek
BY
S. J. Rotondi, A. J. Dupont & E. R. Mackert

United States Patent Office 2,941,543
Patented June 21, 1960

2,941,543

PRESSURE REGULATOR MODIFICATION

Walter S. Kleczek, Schenectady, N.Y., assignor to the United States of America as represented by the Secretary of the Army Filed Sept. 29, 1958, Ser. No. 764,204

1 Claim. (Cl. 137—505.18)

This invention relates to a pressure regulator and more particularly to a pressure regulator which will provide a substantially constant outlet pressure for widely varying inlet pressures.

In many instances such as in equipment testing it is necessary to provide a gas at substantially constant pressure while the only source of pressure is from supply bottles. Under such conditions when the supply bottle is first tapped very high pressure must be reduced, whereas, when the bottle is nearly exhausted very little reduction in pressure is required. Thus, a regulator is required which can take widely varying inlet pressures and provide a substantially constant outlet pressure.

It is an object of this invention to provide a pressure regulator which will provide a constant outlet pressure for widely varying inlet pressures.

Another object is to provide a pressure regulator in which the slidable valve member has opposed equal areas subjected to inlet pressure so that variations in inlet pressure will not affect the operation thereof.

Yet another object of this invention is to provide a pressure regulator in which the slidable valve member is subjected to atmospheric pressure over a part of its surface.

Figure 1:
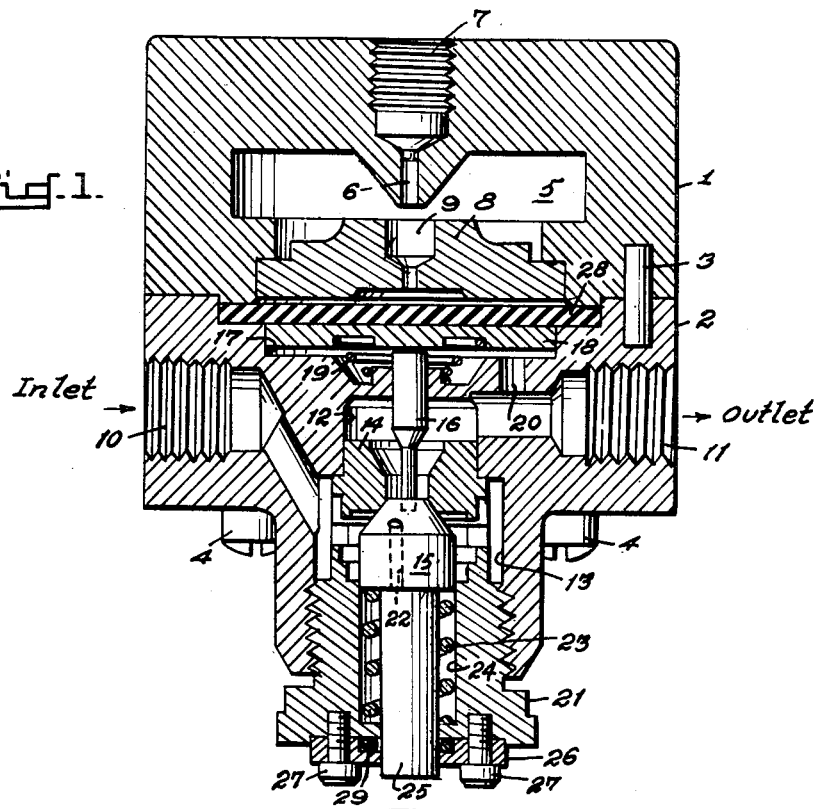
Figure 2:
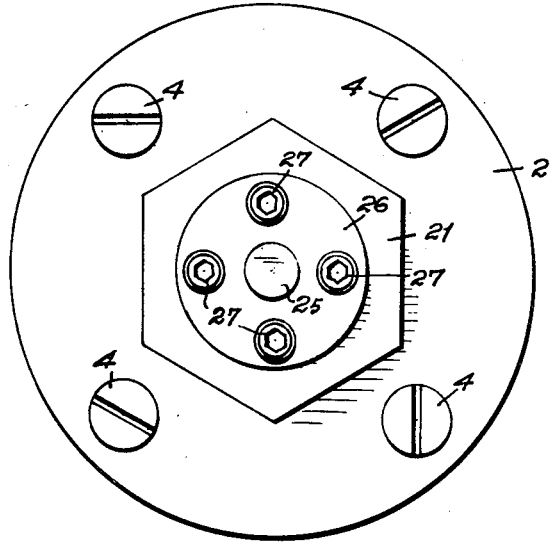

These and other objects will become more apparent when reference is had to the following detailed description and drawing in which:

Figure 1 is a sectional elevation view of the pressure regulator of this invention, and, Figure 2 is a bottom plan view of the regulator shown in Figure 1.

In Figures 1 and 2 of the drawing is shown the pressure regulator which forms the subject matter of this invention. The casing of the regulator is formed of two parts 1 and 2 which are keyed together in correct rotative position by the pin 3 and are held together by means of a number of bolts 4. Clamped between the casing parts is the flexible diaphragm 28. The upper casing part 1 is provided with a recess 5 which forms a pressure chamber, a passageway 6 by which the pressure chamber may be charged and plug 7 to seal off the pressure chamber after it has been charged to the pressure required to give the desired outlet pressure from the regulator. The upper casing part 1 is also provided with insert 8 which acts as a backing plate for the diaphragm and this insert is provided with passageway 9 to admit pressure from chamber 5 to the upper side of diaphragm 28.

The lower half of the casing 2 as illustrated in Figure 1 is provided with inlet passage 10, outlet passage 11, internal bore 12 and counterbore 13. Seated in the bore 12 is a plug 14 having a central passage therethrough, this passage being conical at the lower end to form a conical seat for the valve core 15 which has a conical upper surface. The lower casing half also is provided with sliding pin 16 which engages the top of the valve core 15 and projects through the central aperture in plug 14. The casing part 2 is bored at 17 and receives the slidable plate 18 which is biased upwardly by light spring 19 and urged downwardly by deflection of the diaphragm 28. Passageway 20 interconnects the outlet passage 11 with the lower side of the diaphragm and thus subjects the lower side of the diaphragm through the plate 18 to regulator outlet pressure.

Referring to Figures 1 and 2 it will be seen that the lower end of casing part 2 is threaded and receives member 21 which has a bore 24 to slidably receive the valve core 15. The core 15 is provided with passageway 22 so that inlet pressure from passage 10 is applied to the under side of the core. The core 15 also has a cylindrical extension 25 which extends through an aperture in the end of member 21 to the outside of the casing. In order to prevent leakage of pressure fluid between the member 21 and extension 25 to the outside of the casing there is provided a plate 26 secured to the member 21 by studs 27 and recessed to receive O-ring seal 29. Spring 23 is provided to bias the valve core to closed position against the action of the diaphragm pressed pin 16.

The diameter of the cylindrical extension 25 of the valve core is selected such that the area of the remainder of the under side of the core is equal to the area of the upper conical surface of the core which is subjected to inlet pressure. In this manner the forces acting on the valve core due to the pressure of the incoming gas are balanced and thus the regulator is not affected by variations in inlet pressure.

In operation the chamber 5 is charged to the degree necessary to produce the desired outlet pressure. This pressure varies for a given outlet pressure depending upon the strength selected for spring 23. In the absence of pressure in the outlet 11, pressure in chamber 5 deflects the diaphragm 28 downwardly to depress pin 16 to open valve core 15. As pressure builds up in outlet passage 11 and on the under side of the diaphragm, the diaphragm returns toward unextended position to gradually close the valve. Inasmuch as the lower end of the cylindrical extension 25 of the valve core is subjected to atmospheric pressure and the inlet pressure on the valve core is equalized by the opposed equal areas, the valve is sensitive to outlet pressure only and will maintain a constant outlet pressure regardless of fluctuations in inlet pressure.

It will be apparent that the embodiment shown is only exemplary and that various modifications can be made in construction and arrangement within the scope of the invention as defined in the appended claim.

I claim:

In a pressure regulator, the combination comprising, a first casing, a second casing secured to said first casing, said first casing having a centrally disposed chamber open at one end thereof and having an access port at the opposite end thereof extending through the wall of said first casing, a detachable plug for sealing said port, an insert closing the open end of said chamber, said insert having a central aperture therethrough, said second casing being provided with opposite first and second communicating axial bores and diametrically opposed inlet and outlet ports, inlet and outlet passageways connecting said inlet and outlet ports with said second axial bore respectively, and a third passageway connecting the outlet passageway with said first axial bore, a spring loaded plate slidably mounted in said first axial bore, a flexible diaphragm clamped between said first and second casings, adjacent said first axial bore, a plug, having an axial passageway defining a conical seat, said plug being fixed in said second axial bore, a detachable member in said second axial bore having an axial bore, aligned with said second axial bore, a spring biased valve core having a cylindrical head portion slidable in said last mentioned bore and having a longitudinal vent therethrough providing communication of inlet pressure to opposite sides thereof, said head portion being conical at one end for seating in the aforesaid conical seat, and an integral cylindrical portion depending from said head portion, a cover plate having an aperture secured over the outer end of said detachable member, said aperture slidably receiving the aforesaid depending cylindrical portion, sealing means seated in said plate adapted to seal between said cover plate and said cylindrical portion of said valve, and a sliding pin fixed at one end to said head on said valve core and extending through said second bore projecting into the path of travel of said slidable plate in said first bore in said second casing.

References Cited in the file of this patent

UNITED STATES PATENTS

| | | |
|---|---|---|
| 877,907 | Collin | Feb. 4, 1908 |
| 2,091,051 | Mesinger | Aug. 24, 1937 |
| 2,202,313 | Grove | May 28, 1940 |
| 2,564,686 | Gray | Aug. 21, 1951 |
| 2,599,577 | Norgren | June 10, 1952 |
| 2,739,611 | Cornelius | Mar. 27, 1956 |
| 2,872,221 | Burns | Feb. 3, 1959 |